United States Patent
Arnold et al.

(10) Patent No.: US 11,010,077 B2
(45) Date of Patent: May 18, 2021

(54) REDUCING DUPLICATE DATA

(71) Applicant: LiveRamp, Inc., San Francisco, CA (US)

(72) Inventors: James Arnold, Tiburon, CA (US); Joshua Lang, San Francisco, CA (US)

(73) Assignee: LiveRamp, Inc., San Francisco, CA (US)

( * ) Notice: Subject to any disclaimer, the term of this patent is extended or adjusted under 35 U.S.C. 154(b) by 354 days.

(21) Appl. No.: 16/284,770

(22) Filed: Feb. 25, 2019

(65) Prior Publication Data
US 2020/0272348 A1  Aug. 27, 2020

(51) Int. Cl.
*G06F 3/06* (2006.01)
*G06F 16/174* (2019.01)

(52) U.S. Cl.
CPC ............ *G06F 3/0641* (2013.01); *G06F 3/067* (2013.01); *G06F 3/0608* (2013.01); *G06F 16/1748* (2019.01)

(58) Field of Classification Search
None
See application file for complete search history.

(56) References Cited

U.S. PATENT DOCUMENTS

| | | | |
|---|---|---|---|
| 8,166,081 B2 | 4/2012 | Christensen et al. | |
| 8,825,805 B2 | 9/2014 | Gollapudi et al. | |
| 9,015,122 B2 | 4/2015 | Harrison et al. | |
| 9,020,900 B2 | 4/2015 | Vijayan Retnamma et al. | |
| 9,116,941 B2 | 8/2015 | Aronovich | |
| 9,219,787 B1 | 12/2015 | Manion et al. | |
| 9,251,160 B1 | 2/2016 | Wartnick | |
| 9,400,799 B2 * | 7/2016 | Jayaraman | G06F 3/067 |
| 9,818,131 B2 * | 11/2017 | Yonebayashi | G06Q 30/0255 |
| 9,940,059 B2 | 4/2018 | Agrawal et al. | |
| 9,952,933 B1 | 4/2018 | Zhang et al. | |
| 10,061,798 B2 | 8/2018 | Colgrove et al. | |
| 2011/0055471 A1 | 3/2011 | Thatcher et al. | |
| 2011/0225129 A1 * | 9/2011 | Agrawal | G06F 16/1748 707/692 |
| 2014/0214775 A1 | 7/2014 | Shi et al. | |

OTHER PUBLICATIONS

Kint, J., "Publishers are getting screwed in the data-tracking era," accessed at https://digiday.com/media/publishers-data-trackers/ on Dec. 27, 2018 (published Apr. 15, 2014).

* cited by examiner

*Primary Examiner* — Amresh Singh

(57) ABSTRACT

A machine and method of reducing duplicate transmission data employs one more more digests to track field/value pairs that have previously been distributed. Each digest contains a record table and a segment table. The record table includes anonymous identifier records, each of which contain an anonymous identifier and one or more indexes into the segment table. The segment table comprises an array of every existing data field/value pair. Before distribution of update data, each record is matched to an anonymous identifier record in the record table. The segment values in the prospective distribution record are compared to the digest's anonymous identifier record, used to determine which data has already been distributed, and thus will be suppressed in the distribution.

19 Claims, 8 Drawing Sheets

REDUCING DUPLICATE DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Online marketing is a subset of marketing by which marketers provide marketing messages to online consumers through digital channels, such as websites, social media, search engines, and email. The online marketing ecosystem consists of a number of important categories of participants. Retailers, or simply "brands," generally maintain their own online presence through one or more channels, but also may seek to advertise their products through online touchpoints maintained by others. Online publishers are entities that offer distribution channels for media. Publishers may publish their own original content, or may mix their own original content with third party content. Marketing services providers are entities that maintain consumer databases to support online marketing efforts. Large marketing services providers may track records for hundreds of millions of consumers, and may track hundreds or even thousands of categories of demographic, psychographic, and purchasing propensity or affinity data about each such consumer. This data may be collected from many sources, including public sources such as address and recent mover data provided by the United States Post Office, and may also include many private sources of data, such as data collected from product warranty registrations. Marketing services providers may provide this data to publishers, or to online marketing services providers that are intermediary between the publisher and the brand, all of which may be collectively referred to as data "destinations." Publishers receive revenue from brands by placing marketing messages for the brands in conjunction with the content or services they provide to their users. For example, a search engine provider such as Google may provide ads at the top of its search result page. The marketing messages may contain, for example, text, still images, and video content.

Although marketing messages may be set so that they appear identically for all users, brands have found that targeted marketing messages are often more effective, and therefore a publisher may charge a brand more for targeted marketing messages. Two well-known types of targeting are inventory targeting and user targeting. Inventory targeting directs messages to a particular group of consumers based on the content of the publisher; for example, the placement of a marketing message at an online forum for skiers allows manufacturers of skiing equipment to target their message to skiers simply by selecting this publisher. User targeting, on the other hand, seeks to serve marketing messages to consumers more likely to be interested in a particular brand by knowing something about the consumers themselves and thereby serving different marketing messages to different consumers. For example, a marketing message may be targeted based on a viewer's geographic location, the viewer's demographic or propensity data, or based on a "segment" to which the viewer is assigned based on purchasing habits. A marketing message may even be tailored to each particular online user, which is known as one-to-one or 1:1 marketing.

Although targeted marketing messages are a critically important source of income for publishers, the publishers often do not have the necessary data about their viewers in order to accurately target messages to them. In particular, publishers generally know online behavior, but they do not know individual identities. By contrast, brands have PII and consumer-specific information, but they don't have online behavior. Marketing services providers cannot simply allow the sharing of data between these entities because marketing services providers are bound by various privacy laws, regulations, and rules, as well as by digital marketing industry best practices. Instead, marketing services providers send publishers data that has been anonymized to remove PII. Anonymous marketing lets brands target ads to select individuals, without letting the brands connect known people to online behavior, and also without letting publishers connect online behavior to known people. Numerous methods have been developed to correctly associate this anonymized data with a particular consumer or consumer group.

The anonymized data sent to publishers is generally updated periodically due to changes in the underlying database. New data may include data evidencing a move, marriage, or birth of a child. For example, the knowledge that a consumer has or is soon to have a child is very valuable to certain brands, because the birth of a child is often associated with a significant number of purchases. Data about such life changes is most valuable when the data is fresh, and thus periodic updates to data may be sent by marketing services providers to destinations as often as daily. But because much of the data doesn't change from one periodic update to the next, the great majority of data being sent to the destinations with each update is duplicative of data previously sent for the same destination/brand combination. For example, a single consumer record may (as noted above) contain hundreds or thousands of fields, and so resending the entirety of the data for the relevant consumers at each update is enormously wasteful of both transmission bandwidth and digital storage. As the available data for consumers continues to grow, the problem becomes more acute, and as a result destinations are beginning to set size limits on data being sent in order to manage the influx. There is thus a need to reduce the amount of data sent by the marketing services provider in each update.

It has been recognized that the quantity of data sent in each update could be reduced by eliminating the re-transmission of data that has already been sent concerning a particular consumer and with respect to a particular retail brand. The simplest solution would be for the marketing services provider to keep an entire record of everything that has been previously sent for a particular destination/brand combination, and compare this data to the data about to be sent in the next update. If there is any data that has changed then that data is sent, but any duplicate data is eliminated from the update. This approach would minimize bandwidth used for an update, but because of the enormous number and size of the records being sent for each of what may be thousands of publisher/brand combinations, this solution is impractical because of the enormous storage burden it would place upon the marketing services provider.

A partial solution to this problem is for the marketing services provider to employ hash tables. These tables keep track of data sent to various publishers, with a separate table for each destination/brand combination. A hash is performed of the entire consumer record for each consumer record sent in each transmission, and each such hash value is stored in the corresponding hash table. This approach eliminates duplication if an entire consumer record being sent in a subsequent update is identical (i.e., the same fields are filled with the same data); this is achieved by hashing each consumer record before each update is sent, and comparing the result to the corresponding value in the hash table. If the values are the same, this means that no data has changed in that particular record, because if any data had changed then the hash values would be different. But because the hash is performed on the entire record, any change in the data at all will cause a mismatch in the hash values, and thus would require the marketing services provider to resend the entire record. This is true even for a record that may contain hundreds or thousands of fields in which only one field value has actually changed. Therefore, such systems eliminate duplication when nothing in a consumer record changes, but do not eliminate duplication of particular fields that are identical in a consumer record if any field in that record changes. The real-world reduction in bandwidth is quite small. Given the ever larger amount of consumer data that is available, this system is not adequate to reduce the size of updates such that the bandwidth of the update transmission becomes manageable. For these reasons, an improved method of reducing bandwidth and storage requirements by eliminating duplicate data sent by a marketing services provider to a destination would be highly desirable.

Items mentioned in this background section are not admitted to be prior art with respect to the present invention.

BRIEF SUMMARY OF THE INVENTION

The present invention is directed to a machine and method of reducing duplicate data sent from a marketing services provider to a destination, such as but not limited to a publisher. In certain implementations of the invention, digests for each server side account (i.e., destination/brand combination) are kept by the marketing services provider. These digests are compared to any subsequent distribution to eliminate duplicate data before distribution to the destination. But instead of hash values as in the hash table example provided above, the marketing services provider maintains a segment table and, for each record in each digest, a list of indexes into the segment table. The segment table comprises an array of every existing consumer data field/value pair. In this way each possible field/value pair is represented only once in the segment table, even though a single field/value pair may apply to millions of records. As data is prepared for distribution, each record in the prospective distribution data is used to perform a segment table look-up in order to determine which data has already been distributed. In this way the digest size is kept small but it may be determined for each consumer record which data has already been sent, and that data may be suppressed on a field-by-field basis before distribution. Thus, for example, if only a single data field in a particular consumer record has been changed, the marketing services provider is able to determine which data field has changed and send only the data from that particular field, rather than re-sending hundreds or thousands of additional fields that did not change. Therefore the bandwidth required to send data to a destination has been greatly reduced, while at the same time keeping storage requirements for the marketing services provider at manageable levels because of the unique digest data structure.

These and other features, objects and advantages of the present invention will become better understood from a consideration of the following detailed description of the preferred implementations and appended claims in conjunction with the drawings as described following:

DETAILED DESCRIPTION OF THE PREFERRED EMBODIMENT(S)

Before the present invention is described in further detail, it should be understood that the invention is not limited to the particular implementations described, and that the terms used in describing the particular implementations are for the purpose of describing those particular implementations only, and are not intended to be limiting, since the scope of the present invention will be limited only by the claims.

As a preliminary matter, certain terms used in the description will be defined. The term "segment data" means any data that is useful for user targeting of marketing messages. This may include a single property, such as gender=male, or may mean a collection of all properties for a given consumer. The term "field/value pair" means a single segment data item, such as dwelling=apartment. Some fields carry a value by their presence alone and do not have an explicit value, such as likes-dogs. The term field/value pair is intended to also include these implicit-value fields. "Duplicate data" means data sent to a destination that repeats information previously sent. An individual record for a distribution to a destination carries an anonymous identifier for the consumer and each of its associated field/value pairs. Duplicate data is any data where multiple deliveries are made for the same destination/brand that includes the same field/value information for a given anonymous identifier.

Figure 1:
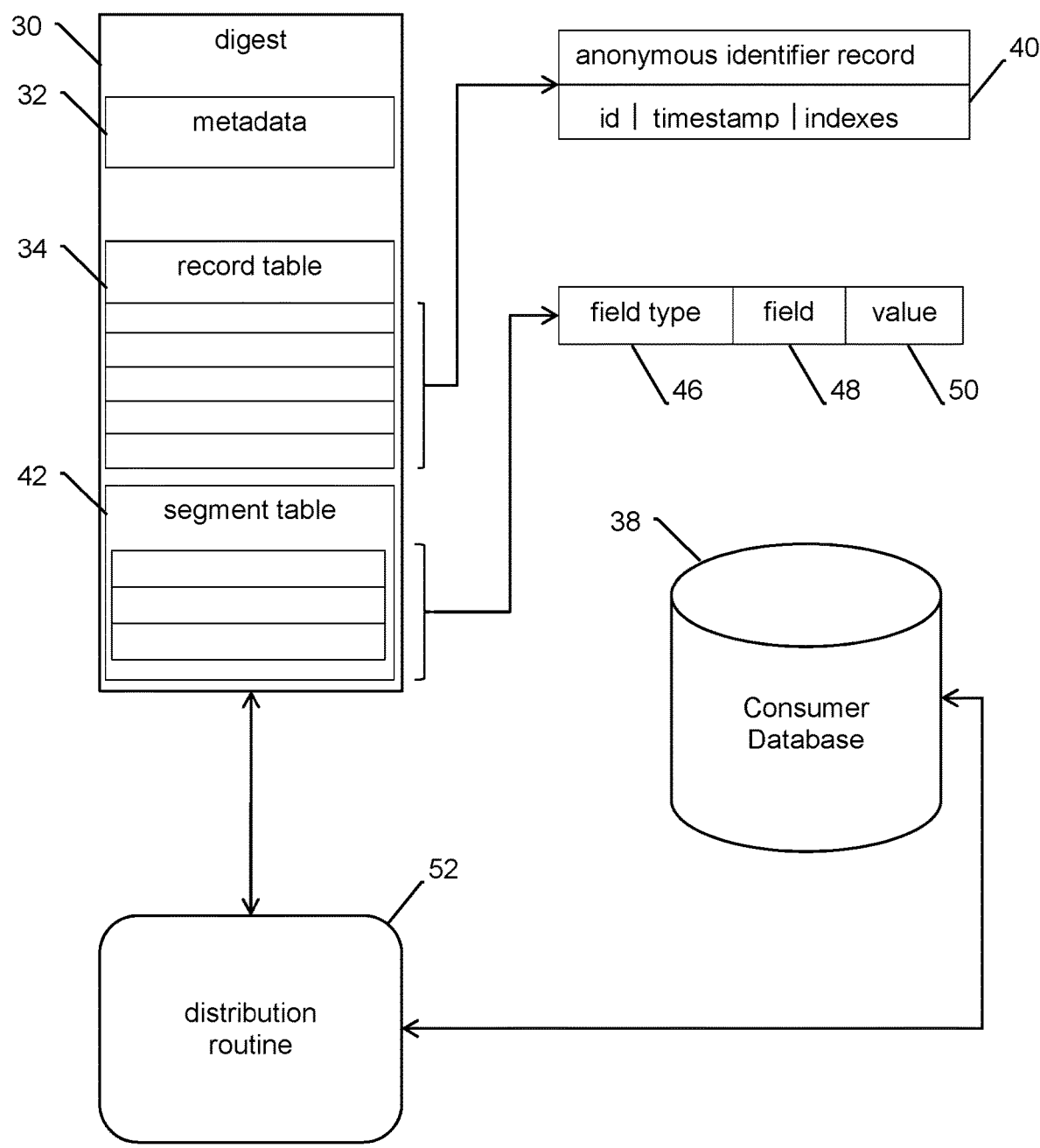
FIG. 1 is a data structure diagram according to an implementation of the present invention.

With reference now to FIG. 1, the implementation of the invention described herein creates a digest 30 at the marketing services provider computing system for each destination/brand combination that is to be the subject of a transmission to a destination. These digests 30 are compared to any subsequent distribution for the same destination/brand to eliminate duplicate data before distribution to the destination. The digests 30 also contain a segment table 42. The record table 34 of the digests 30 contain, for each consumer record, one or more index values into the segment table 42. The segment table 42 comprises an array of every existing consumer data field/value pair. In this way each possible field/value pair is represented only once in segment table 42, even though a field/value pair may apply to a great many consumer records. This structure greatly reduces the storage requirements of the marketing services provider with respect to each digest 30 and segment table 42. When a data distribution is initiated, a preliminary distribution file is created that contains the complete records for all consumers associated with the distribution. Then the preliminary distribution file is scanned, with each consumer record in the corresponding record table 34 of digest 30 used to perform a lookup in segment table 42. For each segment that has previously been sent as indicated by this data, that segment is suppressed before distribution occurs. In this way the digest size is kept small but it may be determined for each consumer record which data (field/value pair) has already been sent, and that data may thus be suppressed on a field-by-field basis before distribution. Therefore, for example, if only a single data field in a particular consumer record is modified, the marketing services provider is able to determine which data field has changed and send only the data from that particular field, rather than sending hundreds or thousands of additional fields that did not change for that consumer record. Therefore, in these implementations of the invention, the bandwidth required to send data to a destination is greatly reduced, while at the same time keeping storage requirements for the marketing services provider at relatively low levels because of the digest data structure.

A more particular description of the data structures of an implementation of the present invention may now be described, still with reference to FIG. 1. A separate digest 30 is maintained in the marketing services provider's computing system for each server side account (i.e., each destination/brand pair). Each digest 30 contains all of the delivered anonymous identifiers associated with the server side account, with one record for each such anonymous identifier stored in record table 34. Each record references the identifier's segment data, including an index corresponding to all of the field/value pairs distributed. Additionally, each digest has a collection of metadata 32 for the digest itself. Metadata 32 may include, for example, a version number identifying the feature level of the digest; a server side account identifier; a request identifier associated with the distribution data to be generated; a creation timestamp indicating the date and time the digest was created; and a distribution timestamp indicating the time this data was or is intended to be distributed. An initialization routine may be used to create the digests.

Typically, the segment data for an individual server side account has a limited population: a relatively small number of fields, and a relatively small number of values for each field. The implementation of the invention described herein, however, will also handle atypical cases with a large number of fields and/or a large number of values for each field. Record table 34 in digest 30 includes an anonymous identifier record 40 for each consumer for which data may be distributed to the destination for this particular server side account. The anonymous identifier records 40 further contain one or more indexes into segment table 42, rather than storing the actual string representations of the field/value pair data. More specifically, there is an anonymous identifier record 40 in record table 34 of digest 30 for each anonymous identifier associated with the distribution corresponding to this digest 30. The anonymous identifier record 40 may contain: the anonymous identifier; a timestamp indicating the date and time that the corresponding anonymous identifier was added to this digest 30; and one or more indexes into segment table 42 giving the field/value pairs associated with the anonymous identifier record 40. In addition, in certain implementations of the invention, each anonymous identifier record 40 may further include one or more indexes into timestamp data; these timestamp entries occur in exact correspondence to the segment data entries, with each index giving the time at which the corresponding field/value pair was added to the anonymous identifier's segment data in segment table 42. The anonymous identifier records 40 in digest 30 are sorted by anonymous identifier. Optionally, the anonymous identifier records 40 may be partitioned such that processing on each partition may be performed in parallel by a multithreading processor or multiple processors in a cluster computing environment.

In further alternative implementations of the invention, each anonymous identifier record 40 may be extended with other information to facilitate additional processing. An earliest timestamp index could be added to indicate when the anonymous identifier record 40 was first added to the digest 30. Explicit timestamps could be used indicating when the anonymous identifier was added and deleted from the digest 30. In addition, in order to track deletions of individual field/value pairs of segment data, a second set of timestamp index values could be added to indicate when a given segment item was deleted from the record. Because these timestamp indexes would likely be quite repetitive, they may benefit substantially from data compression.

The anonymous identifier records 40 may also be modified in order to handle non-enumerated field/value pairs (i.e., field/value pairs that can assume an unlimited number of possible values). If the field/value pair is used frequently, it can be added to the segment table 42 and referenced by index just as if the data were enumerated. A list of raw field/value data can then be added to the anonymous identifier record 40. This could be represented as an additional array of values that are in addition to the segment table 42 indexes to the actual distribution data from database 38. The decision to use indexes or raw data may be dynamic, adjusting the record structure to the actual distribution data. Both methods could be used in the same digest 30, even in the same anonymous identifier record 40. This approach limits the growth of digest 30 when data is being transmitted to a destination that does not allow non-enumerated data, but keeps open the possibility of sending non-enumerated data to those destinations that do allow this data.

Segment table 42 may be understood as a variable-length array that implements an index comprising corresponding segment data. The index value may be implicit, based on the corresponding location in segment table 42, or may be explicit by placing each index value in a separate field for each array entry. Because of the structure, this data may be compressed if desired. Segment table 42 contains for each segment a field type designation 46, a segment field identifier 48, and an actual enumerated value 50 for the segment data. For example, one entry in the segment table may contain a field type designation 46 of "string," a segment field identifier 48 of "gender," and an enumerated value 50 for the segment data of "male." Alternatively, another entry in the segment table may be of field type designation 46 "numeric," with a segment field identifier 48 of "age" and an enumerated value 50 of "45."

Figure 2:
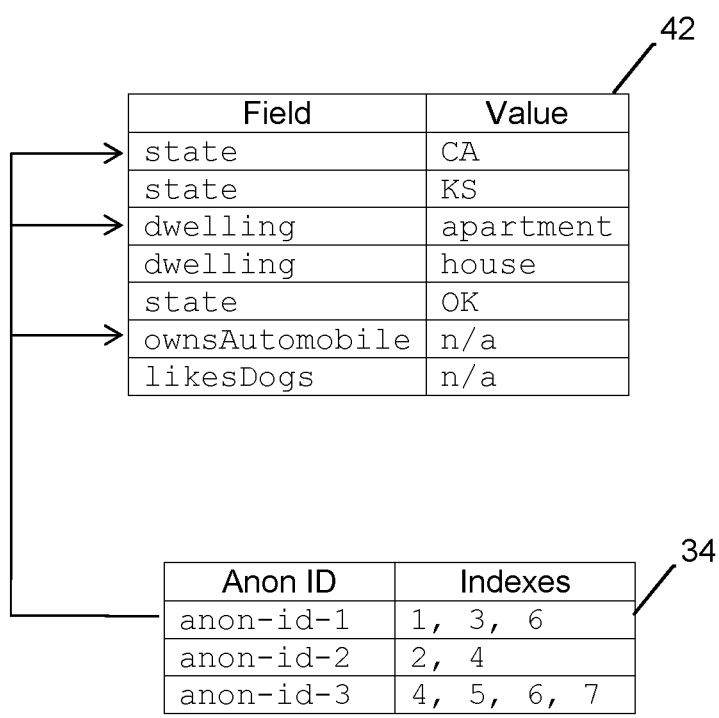
FIG. 2 is an example of a data-filled record table and segment table according to an implementation of the present invention.

The interworking of anonymous identifier records 40 of record table 34 and segment table 42 may be further described with reference to the example provided in FIG. 2. In the figure, example data are filled in for record table 34 and segment table 42. (It may be noted that some fields have been omitted here for clarity.) In the first row of record table 34 is a record (an anonymous identifier record 40) for a first anonymous identifier. This anonymous identifier has index values of 1, 3, and 6, which means that the field/value pairs associated with this anonymous identifier are stored in segment table 42 at positions index 1, index 3, and index 6, respectively. The connection between these data structures is shown by the arrows of FIG. 2. Again, it may be noted that segment table 42 has a row for every field/value pair present in any of the data related to any of the anonymous identifiers in record table 34. By using the indexes in record table 34, the machine may look up the corresponding field/value pairs for purposes of constructing a transmission. Because segment table 42 contains only one instance of each field/value pair, even though some of these field/value pairs may be repeated millions of times in the actual data, this greatly reduces the storage requirements for the marketing services provider.

There are several special situations that arise during operations that will need to be addressed. When an entirely new distribution is being prepared, segment data field/value pairs will need to be extracted from the raw data at database 38 (shown in FIG. 1) maintained by the marketing services provider. Every field/value entry in the new distribution should be added to the digest's segment table 42. Additionally, an anonymous identifier record 40 should be created for each entry in the new distribution, adding the record to the digest's record table 34. The digest's anonymous identifier records 40 should be created to contain indexes for all field/value entries in the new distribution's corresponding record. In addition, the indexes should be assigned consistently and made available to all applications/threads using segment table 42. In some cases new segment data may be brought in through multiple different tasks, and thus the values need to be consolidated into a single view.

When a new distribution is being prepared, the raw data might omit anonymous identifiers that were previously known. The identity mapping for consumer data could change, and the consumers might no longer reference a particular anonymous identifier. When this happens for an incremental distribution (i.e., an update), the updated digest should retain the omitted anonymous identifiers. This is preferred for fault recovery, in case a prior incremental delivery needs to be regenerated. When this happens across a backfill (i.e., full reset) distribution, the anonymous identifier should be removed. A backfill distribution generates a complete refresh of the digest, and the digest should contain only the data provided by the raw input. The raw data for a distribution might also omit a previously known field/value pair for an anonymous identifier. This may be handled similarly to full records. Incremental distributions may retain the "obsolete" field/value pair in the digest for fault recovery, but a backfill distribution should drop the field/value pair from the digest. In other words, each digest 30 should represent the cumulative state of a server side account's distribution, starting from the last backfill. Data should not be deleted until the next backfill distribution.

Figure 3:
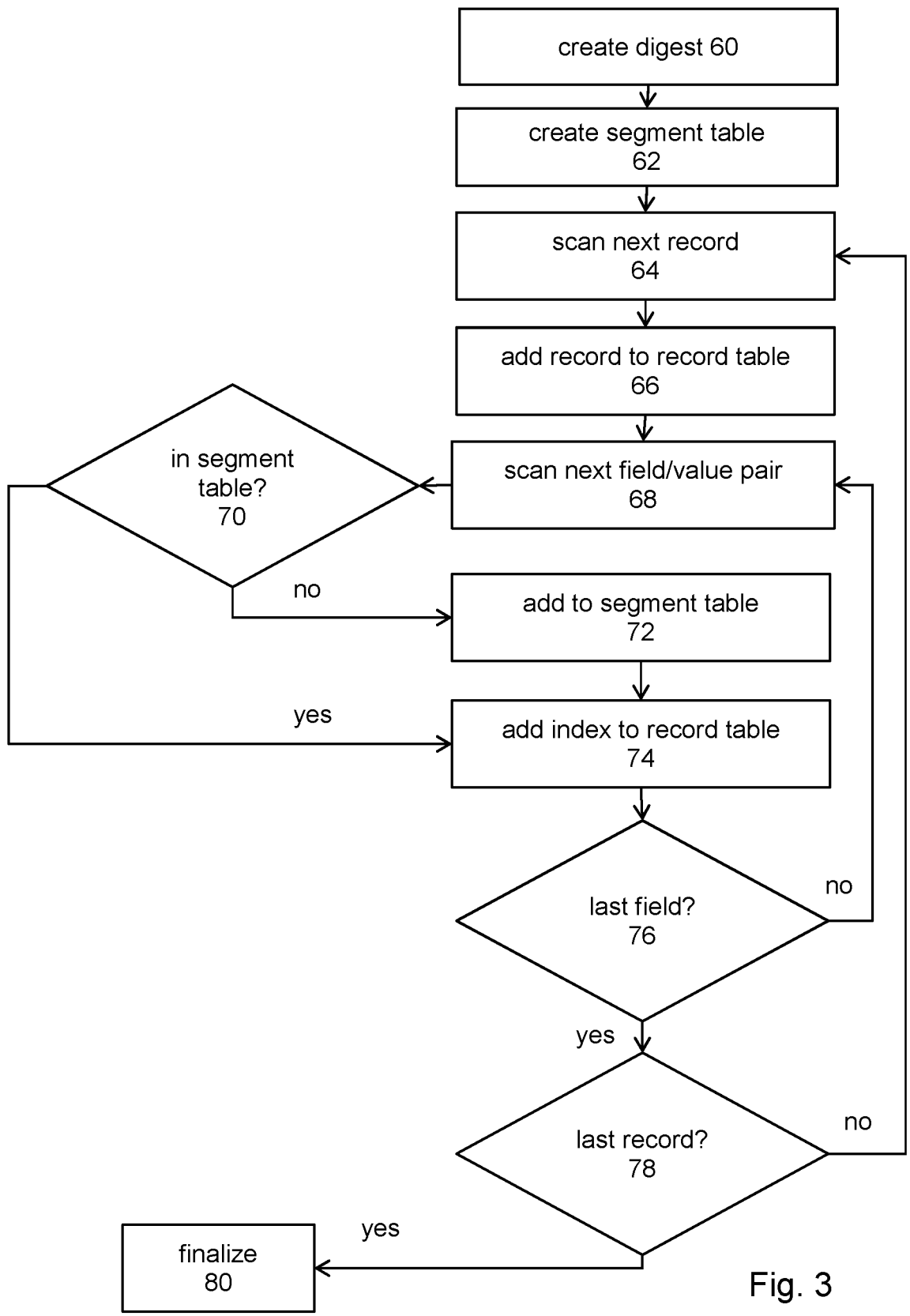
FIG. 3 is a flowchart representing the process for creating a new or backfill digest and segment table according to an implementation of the invention.

With these factors in mind, the processes for generating a new digest 30 may be described first with respect to a full refresh digest as required in the case of a backfill request. The flow for this process is shown in FIG. 3. The input will be raw distribution data (from the marketing services provider's consumer database 38), which is sorted by anonymous identifier. The output will be the baseline digest 30. To begin, digest 30 is created at step 60; digest 30 includes a timestamp table, which will have only a single entry at this point. At step 62, an empty segment table 42 is created and added to digest 30. Then at step 64, each record of the raw data is scanned in sequence. The new record is added as an anonymous identifier record 40 to the new digest 30 at step 66, and then processing moves to scanning each field/value pair for that record at step 68. If the field/value pair is not found to be already in segment table 42 already at decision block 70, then it is added to segment table 42 at step 72. Regardless of whether the field/value pair was found to be already in segment table 42, processing in either case moves to step 74, where the corresponding index is added to the appropriate anonymous record 40 in record table 34 of digest 30. At decision block 76, the process asks if this field/value pair corresponds to the last field in the current record, and if not processing returns to step 68 to repeat the process until all field/value pairs of the record have been checked. If it is determined at decision block 76 that the last field/value pair has been reached, then at decision block 78 it is asked if this is the last record in the raw distribution data; if not, then processing returns to step 64 to scan the next record, but if so then processing goes to completion at finalize step 80, which includes adding metadata to digest 30.

Figure 4:
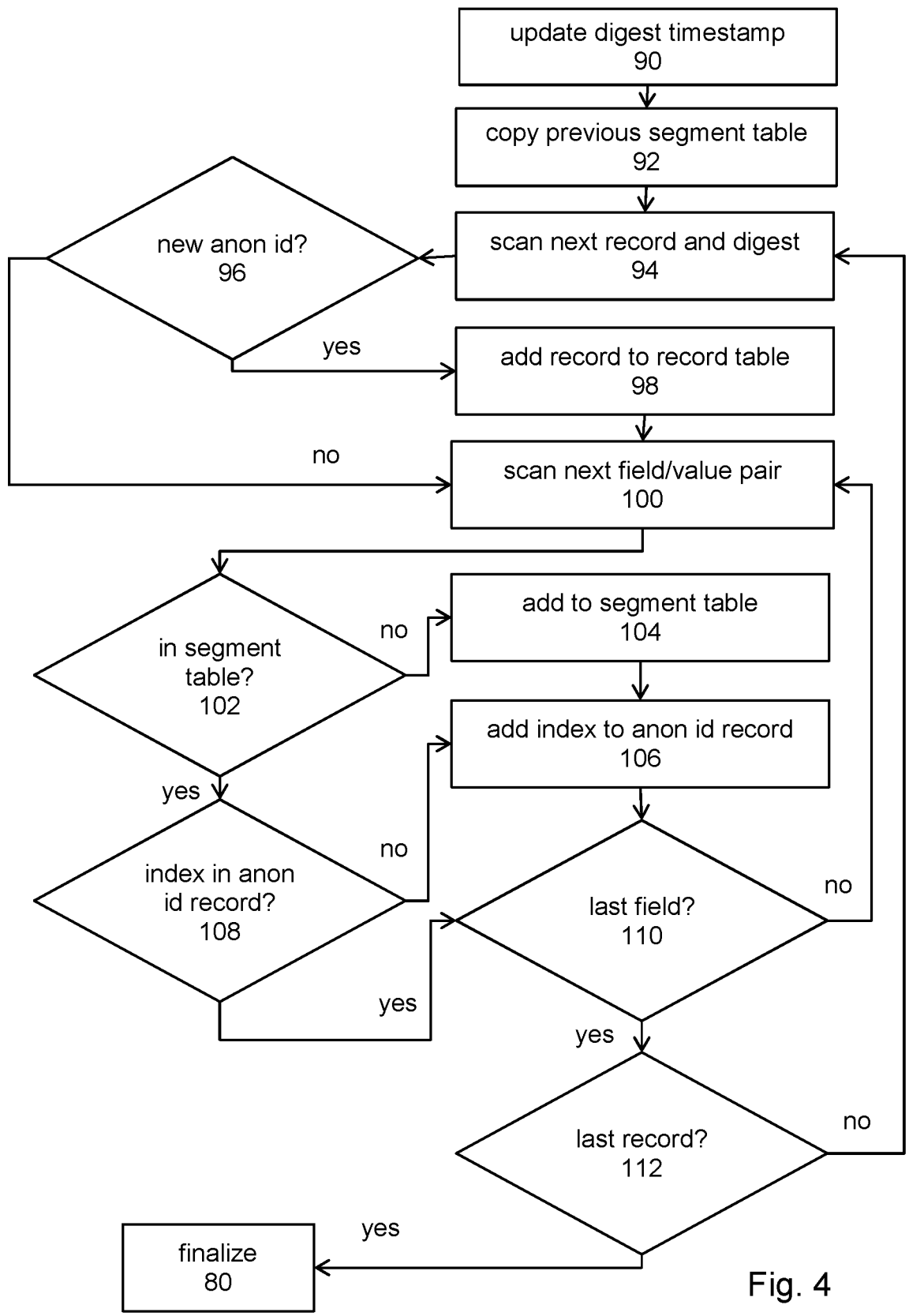
FIG. 4 is a flowchart representing the process for updating a digest and segment table according to an implementation of the invention.

Referring now to FIG. 4, one process for an incremental update to digest 30 may be described. The inputs for this process include the previous digest 30 and raw distribution data from consumer database 38. To begin, digest 30's timestamp table is updated to include a new entry for the processing timestamp, at step 90. The new segment table 42 is created at step 92; it begins as a copy of the old segment table 42. Then at step 94 the raw distribution data from consumer database 38 and the previous digest 30's anonymous identifier records 40 from record table 34 are read in. This process is facilitated by the fact that both of these data structures are sorted by anonymous identifier so that matching is simplified. Note that this process may be performed in parallel to take advantage of multithreading processors or cluster computing environments. If, at each scan of new raw data, a new anonymous identifier is found, represented by decision block 96, then a new anonymous identifier record 40 is created and added to record table 34 at step 98. In either case, processing them moves to step 100, where the next field/value pair is read from the current record of the raw data. If the field/value pair just read is not already in segment table 42 as determined at decision block 102, then at step 104 the field/value pair is added to segment table 42, and then at step 106 the corresponding index is added to the currently processed anonymous identifier record 40. If the field/value pair was found in segment table 42 at decision block 102, then processing moves to decision block 108, where it is determined whether the index for that field/value pair is already in the anonymous identifier record 40 that is currently being processed. If not, then processing moves to block 106, where—just as in the case when the field/value pair was missing from segment table 42—the index is added to the currently processed anonymous identifier record 40. Processing then moves to decision block 110, where it is determined whether the last field/value pair for the record has been processed; if not, processing moves back to step 100 for the next field/value pair. If the last field/value pair for the record has been processed, the processing moves to decision block 112, where it is asked whether this is the last record to be processed. If not, then processing moves back to step 94 for the next record; otherwise, the process moves to finalize step 80 as described above with reference to FIG. 3.

In creating a new segment table 42, the inputs to this process are the raw distribution data and the previous digest 30. This process may be performed in two alternative ways. In the first approach, the raw distribution is scanned for the purposes of identifying field/value pairs for each anonymous identifier. These are extracted as a set of all field/value combinations, indexes are assigned, and these are added to segment table 42. In the second approach, the field/value pairs are extracted and saved to a separate segment database. Segment table 42 can then be created as a union of all of the entries in this segment database. Note that a digest 30's segment table 42 may have "unused" entries. It may be convenient to ensure that all digests 30 calculated (each corresponding to a destination/brand) should have identical index assignments for common field/value pairs in segment table 42, but this is not an absolute requirement.

Another way of understanding the processing required before distribution may be described with respect to FIG. 1. When preparing data for distribution, the distribution routine 52 reads the raw data from the marketing services provider consumer database 38 and reads the appropriate digest 30. These processes may be performed in parallel. Any raw-data tuples (field/value pairs) already in the digest 30 by way of indexing into the segment table 42 are dropped; the distribution data only contains the remaining (new) raw-data tuples. The distribution routine 52 in the marketing services provider's computing system updates the appropriate digest 30 to reflect those new tuples and saves the updated digest 30 for the next distribution.

Figure 5:
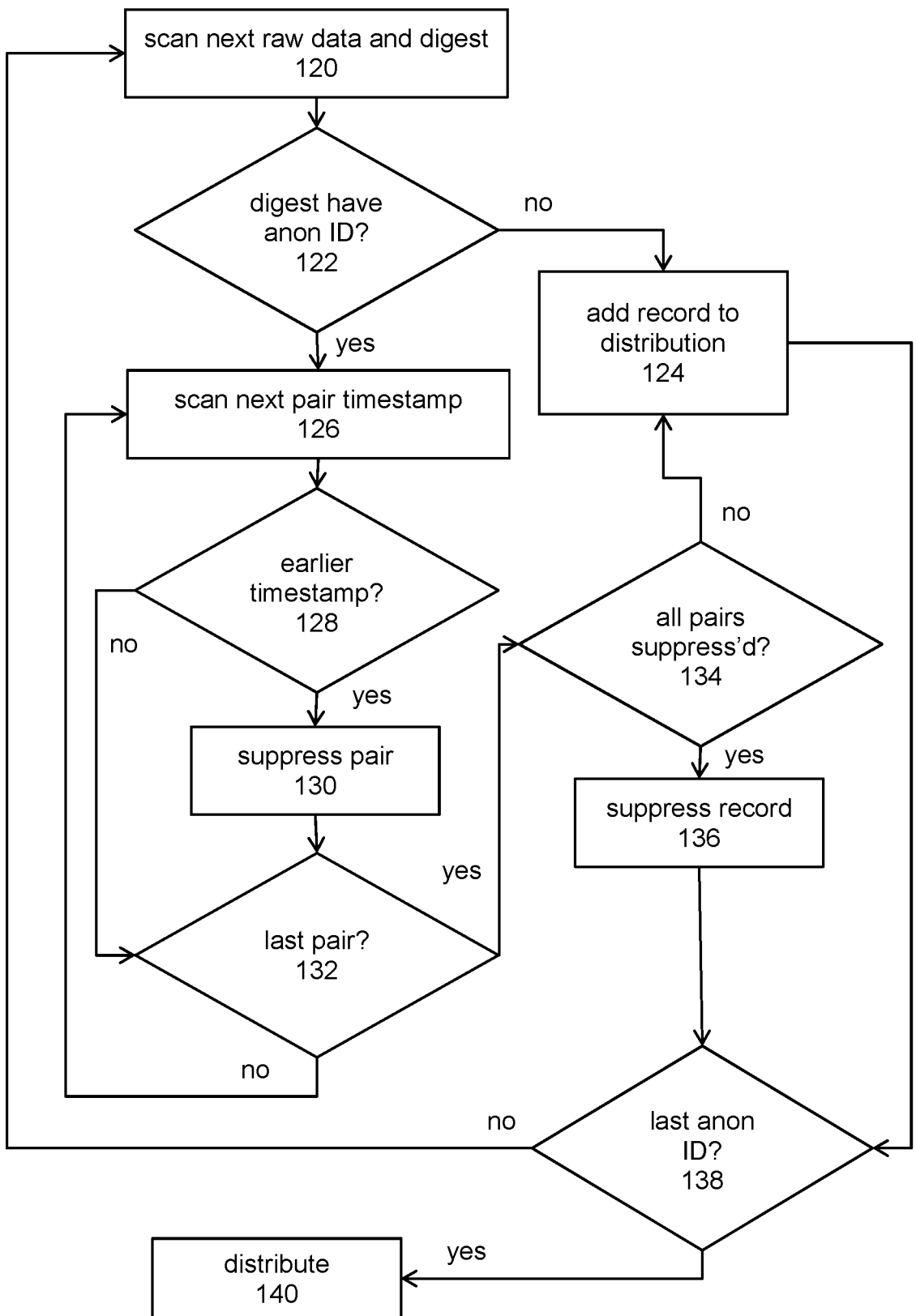
FIG. 5 is a flowchart representing the process for making an incremental distribution according to an implementation of the invention.

When a distribution is to be made to a destination, there is a separate procedure for backfill distributions and incremental distributions. The backfill distribution simply requires a scan of the raw data, one record at a time, then converting each record to the destination's required format and appending each record to the overall distribution package. The more complex process for an incremental distribution may be described with reference to the flowchart of FIG. 5. The inputs are the raw distribution data, the previous or current digest 30, and the corresponding timestamps. The output will be a delivery package for distribution. At step 120, the raw distribution data and the digest anonymous identifier records 40 in record table 34 are scanned. These may be scanned in parallel. Both sets should be sorted by anonymous identifier, such that extra/missing entries may be easily identified with a single pass of both record sets. Processing begins with respect to each anonymous identifier in the data set. At decision block 122, it is determined whether record table 34 of digest 30 contains an anonymous identifier record 40 for the anonymous identifier from the raw distribution data. It if does not, then the record is simply appended to the distribution set at step 124 and processing continues for the next anonymous identifier. If the digest does contain an anonymous identifier record 40 for the anonymous identifier, then processing is performed to determine whether each field/value pair associated with that anonymous identifier should be distributed. At step 126 the digest timestamp for the next field/value pair is scanned. If the field/value pair has a digest timestamp that is before the processing timestamp for digest 30, as determined at decision block 128, then the field/value pair is suppressed from the distribution at step 130. (It follows then that, if the field/value pair has a digest timestamp that is on or after the processing timestamp for digest 30, then the field/value pair is left in the distribution.) At decision block 132 it is determined if this is the last field/value pair associated with the anonymous identifier; if not, then processing returns to step 126 to address the next field/value pair. If the last field/value pair for the anonymous identifier is reached, then at decision block 134 it is determined whether all of the field/value pairs for this particular anonymous identifier have been suppressed. If all field/value pairs have been suppressed, then the entire record is suppressed at block 136 (which is equivalent to skipping block 124) before moving to decision block 138 to determine if this is the last anonymous identifier. If any field/value pairs remain, then the record is added to the distribution at block 124 and processing continues to decision block 138. If at decision block 138 it is determined that there are anonymous identifiers remaining, then processing returns to step 120; otherwise, the data set is now complete and distribution may begin at block 140. Although not called out in this process flow, it should be noted that the updated digest can be created simultaneously with or independently from the generation of an incremental distribution package.

Figure 6:
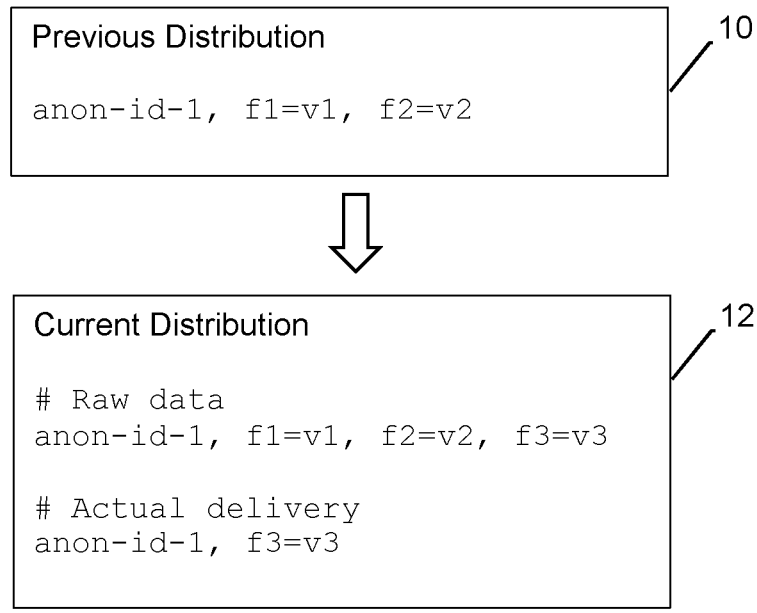
FIG. 6 is a flow diagram for a first exemplary data distribution according to an implementation of the present invention.

Referring to FIG. 6, the data flow for a first example of the results of using an implementation of the present invention may be described. The previous distribution for a particular destination/brand at block 10 includes an anonymous identifier for a particular consumer and two field/value pairs for that consumer. In a subsequent (current) distribution at block 12, the raw data at the marketing services provider includes an additional field/value pair for this consumer's anonymous identifier for a total of three field/value pairs. The duplicate suppression as herein described prevents distribution of the two field/value pairs that were previously sent, and only the third field/value pair is transmitted.

Figure 7:
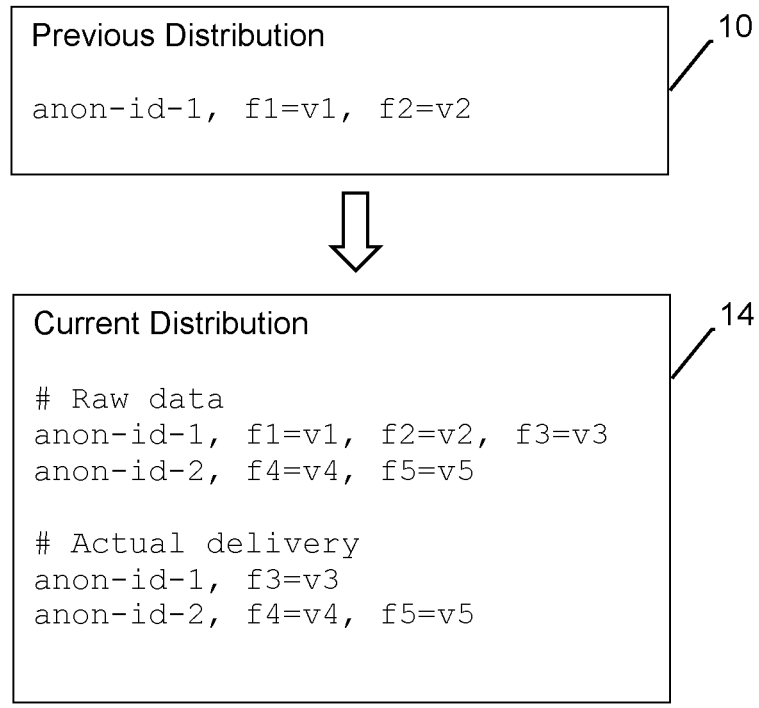
FIG. 7 is a flow diagram for a second exemplary data distribution according to an implementation of the present invention.

Referring to FIG. 7, the data flow of FIG. 6 is expanded to show a second anonymous identifier added to the distribution in block 14. Because there was no data previously transmitted for this new anonymous identifier, all of the field/value pairs for this identifier should be transmitted in the subsequent transmission. The bandwidth reduction is the same as in the example of FIG. 6 because the duplicate data associated with the first anonymous identifier is not re-transmitted.

Figure 8:
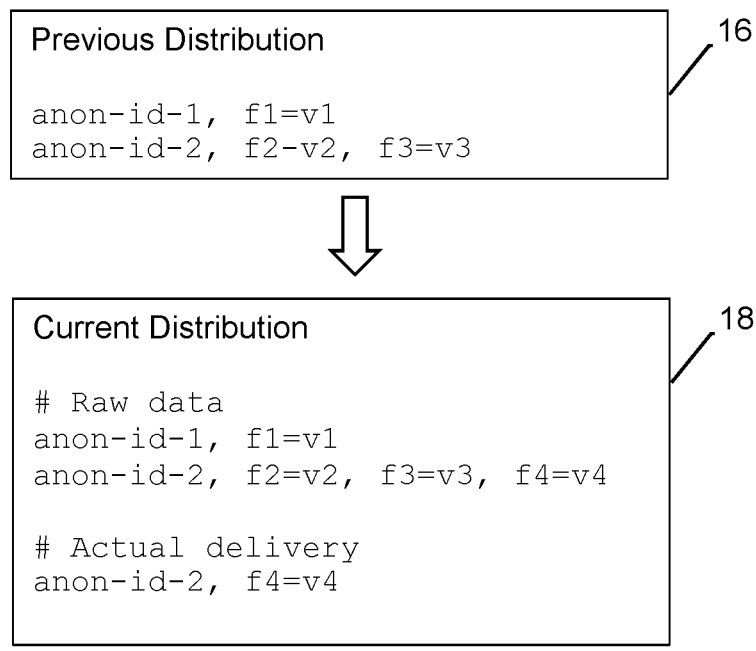
FIG. 8 is a flow diagram for a third exemplary data distribution according to an implementation of the present invention.

Referring to FIG. 8, the previous distribution in block 16 in this case provided distribution concerning two anonymous identifiers. The raw data for the subsequent distribution in block 18 shows that the data did not change at all with respect to the first anonymous identifier, and therefore no data is transmitted with respect to the consumer associated with this anonymous identifier. There was one additional field/value pair associated with the second anonymous identifier, however, and thus this additional field/value pair is transmitted in order to capture the change.

Figure 9:
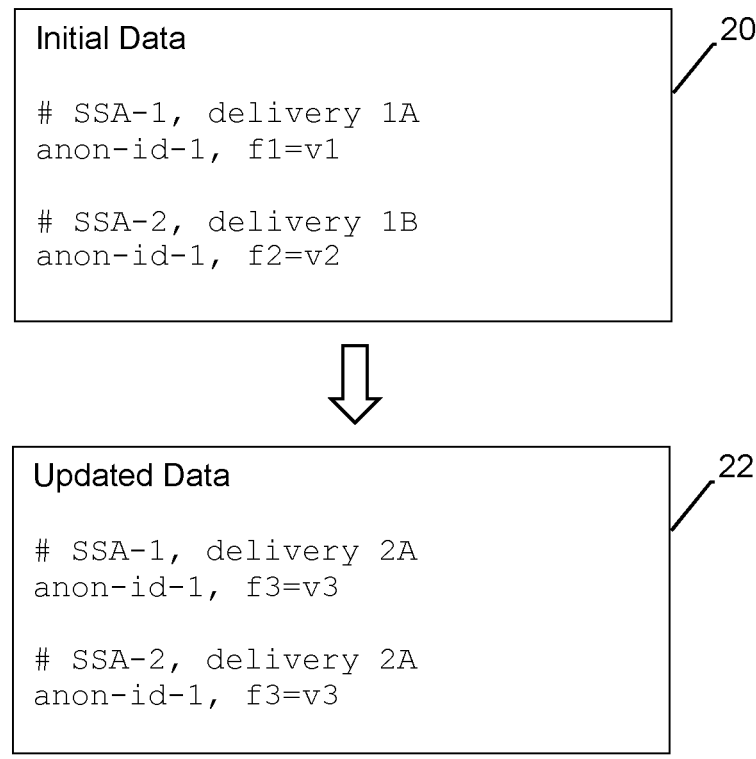
FIG. 9 is a flow diagram for a fourth exemplary data distribution according to an implementation of the present invention.

Referring to FIG. 9, an example is provided where data is provided to two different server side accounts. This may correspond, for example, to distributions directed to the same destination but which is used for different brands. This is a common real world occurrence, because a very popular destination may in fact receive hundreds of transmissions each related to a different brand. It may be seen that in this specific example, the first account was previously sent a first field/value pair associated with the anonymous identifier, and the second account was previously sent a second field/value pair associated with the anonymous identifier, as shown in block 18. In block 20, the updated data is the third field/value pair f3=v3. But in this case the new field/value pair is sent twice, because it is sent to each of the two different accounts, which are maintained separately by the destination.

Figure 10:
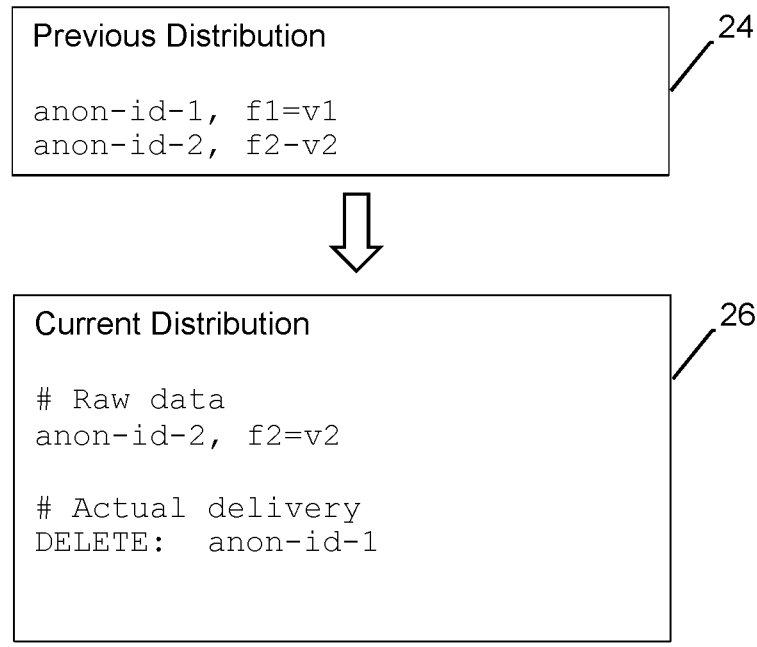
FIG. 10 is a flow diagram for a fifth exemplary data distribution according to an alternative implementation of the present invention.

In alternative implementations of the invention, the digests may support deletions of segment data or deletions of anonymous identifier records. In the implementation described above, it may be seen that when segment data changes the segment is no longer transmitted, but the corresponding field/value pair remains in the digest. Likewise, if an anonymous identifier drops out of the distribution data (such as for a consumer that is no longer tracked), no data is sent for that anonymous identifier but the anonymous identifier remains in the digest. In alternative implementations of the invention, the digest may support the deletion of such segment data or anonymous identifiers, or methods to flag or mark such segment data or anonymous identifiers as deleted. This functionality may support, for example, enforcement of consumer opt-out preferences. One example is illustrated in FIG. 10. In this case, the previous distribution shown in block 24 contains a field/value pair for each of two anonymous identifiers. But in the raw data shown for the subsequent distribution in block 26, data for the first anonymous identifier has been removed. Using the implementation of the invention described above, the actual delivery in this case would be empty, because there is no new data to transmit. This would also, however, keep the deleted anonymous identifier in the records for the destination. Therefore in an alternative implementation the delivery would be an instruction to actually delete the anonymous identifier for which the marketing services provider is no longer tracking any data. This instruction would mean deletion of the anonymous identifier itself along with all field/value pairs associated with the anonymous identifier.

Figure 11:
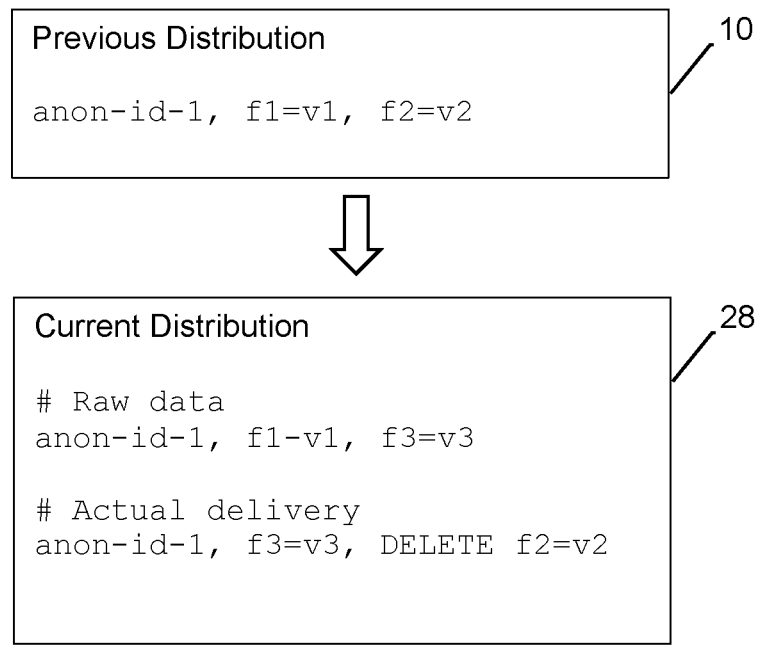
FIG. 11 is a flow diagram for a sixth exemplary data distribution according to an alternative implementation of the present invention.

FIG. 11 illustrates a further development of the alternative implementation illustrated in FIG. 10, which allows for deletion of particular field/value pairs at the destination. The previous distribution is identical to that in FIG. 6, shown in block 10. In this case, however, the raw data shows two changes for the anonymous identifier: the deletion of field/value pair f2=v2, and the addition of field/value pair f3=v3. In the implementation of the invention described above, the actual delivery would be to send the anonymous identifier with the new f3=v3 field/value pair, but the f2=v2 field/value pair would remain on the records of the destination. Instead, in this alternative implementation an additional delete command is sent, as shown in block 28, instructing the destination to both add the new field/value pair but also to delete the field/value pair that was removed by the marketing services provider.

In another alternative implementation of the invention, the implementation may support segment-only distributions. This may be useful where an entirely new type of segment data is added to the marketing services provider's consumer records, or where segment data is of a temporary nature. An example may be segment data for limited-offer-on-freshly-baked-cookies, which will impact only certain consumers. A transmission could be made for the sole purpose of updating the destination's records with respect to this single segment for only those anonymous identifiers in a destination/brand set that include this segment value.

In another alternative implementation of the invention, the digest may be "refreshed" after a certain period of time. Some destinations periodically expire short-lived anonymous identifiers such as browser cookies, thereby allowing for the deletion of old destination data. A refresh distribution may be coordinated between the marketing services provider and the destination such that, for example, each time the destination discards all of its data a complete new set of data is sent by the marketing services provider, or a "refresh" set is sent including only those anonymous identifiers that the marketing services provider knows to be active.

The inventors hereof have performed distribution measurements in order to better understand the capacity of the invention in its various implementations to reduce the required bandwidth for a transmission while maintaining reasonable storage requirements for the marketing services provider. Initially, data was gathered concerning the processing of an existing system that uses hash tables as described above in the background section. Over a fourteen-day period, 849,042,839 records were transmitted, each containing one anonymous identifier and one or more field/value pairs. The required data usage for this process was 629 GB. It was found that the total number of unique field/value pairs was 139,898. The mean field appeared in 633,702 records (0.075% of the total records). The least frequently used field/value pair appeared in exactly one record, which occurred 4409 times. The most frequently used field/value pair appeared over 216,000,000 times (25% of the total records). The minimum field count for the records was a single field, which appeared in approximately 139,000,000 records. The maximum field count for any one record was 1,821, while the mean field count was 104. There were approximately 391,000,000 records (45% of the total) that had 10 or fewer fields, and over 99% of the records had fewer than 700 fields. Finally, measurements were taken where each record's entire collection of field/value pairs was treated as one set, with duplicate field/value pairs eliminated. The result was approximately 385,000,000 collections (45% of the record total). There were approximately 349,000,000 different sets used by one record each (41% of the total records). A single set was used by over 78,000,000 records. It may be noted that each distinct field/value pair can be represented by a single bit for storage and transmission purposes. The bit vector for the records with a single field (approximately 139,000,000 records as noted above) would thus require 17,488 bytes. With a mean of 104 fields per record, the average record would set 0.07% of the bits in a complete bit vector. The maximum of 1,821 fields per record occupies 1.3% of the bits in a complete vector. It may be seen, therefore, that this data represents a very low information density, which allows for very significant gains from data compression.

Comparing operation of the old hash table approach to the new approach in an implementation of the present invention as described herein, in a particular example it was found that the old approach resulted in a transmission of 36.0% unique data, which means that duplicate or wasted data represented 64.0% of the transmission. Utilizing an implementation of the invention, the quantity of unique data rose to 95.7%, such that duplicate or wasted data represented only 4.3% of the transmission. This was an average over a number of destinations; in some cases, the duplicate or wasted data was reduced to very near zero. The implementation of the invention was able to represent the same information with about 37.6% of the quantity of data required using the old approach, thus eliminating 63.4% of the data from the old transmission. This translates into very significant performance increases at both the marketing services provider and the destination. By reducing the delivery file size by roughly 63%, storage space is greatly reduced at the marketing services provider; this data is held in storage while the delivery is waiting for transmission. Likewise, the network usage to transmit the data is reduced by roughly 63%, thus greatly reducing the transmission burden on both the source and destination network. Finally, because the destination performs further processing on the data once received, the processing required at the destination size is similarly reduced by roughly 63%. These significant reductions in storage space and transmission bandwidth required translate into very significant cost savings for both the marketing services provider and the destination.

The implementations of the invention described herein relate to consumer records and consumer data distributed for purposes such as online marketing messages, but the invention is not so limited. The invention may be employed for the purpose of reducing duplicate data for any type of data that is to be updated by periodic transmissions.

In various implementations of the present invention, the operations and the processes described above may be implemented in digital electronic circuitry, in tangibly-embodied computer software or firmware, or in combinations of these approaches. The invention may be implemented as one or more computer programs, with separate subroutines created by computer program instructions encoded on a tangible non-volatile computer storage medium for execution by a data processing apparatus. The computer storage medium may be a machine-readable storage device, a machine-readable storage substrate, a random or serial access memory device, or a combination of one or more of these.

The term "data processing apparatus" includes all types of apparatus, devices, and machines for processing data, including by way of example a programmable processor, a computer, multiple processors or computers, and a cluster computer environment consisting of multiple processors that may perform operations in parallel. The apparatus may include special purpose logic circuitry. The apparatus may also include, in addition to hardware, code that creates an execution environment for the computer program in question, that is, code that constitutes processor firmware, a protocol stack, a database management system, an operating system, or a combination of one or more of these.

A computer program (which may also be referred to or described as a program, software, a software application, a module, a routine, a script, or code) may be written in any form of programming language, including compiled and interpreted languages, or declarative or procedural languages, and it can be deployed in any form, including as a standalone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, optical disks, or solid state storage devices. However, a computer need not have such devices.

To provide for interaction with a user, a computer may have a display device, such as an LCD (liquid crystal display) monitor, for displaying information to the user, and a keyboard and a pointing device, such as a mouse, by which the user can provide input to the computer. The computer or computing system may further include a back-end component, such as a data server, or a middleware component, such as an application server, or a front end component, such as a client computer having a graphical user interface or a Web browser through which a user can interact with an implementation of the subject matter described herein, or any combination of one or more such back end, middleware, and front end components. The components of the system may be interconnected by any form or medium of digital data communication, e.g., a communication network. Examples of communication networks include a local area network ("LAN") and a wide area network ("WAN"), such as the Internet.

The computing system can include clients and servers. A client and server are generally remote from each other and typically interact through a communications network. The relationship of client and server arises by virtue of computer programs running on the respective computers and having a client-server relationship to each other.

While the description of implementations of the invention here contains many specific implementation details, these should not be construed as limitations on the scope of what may be claimed, but rather as descriptions of features that may be specific to particular implementations. Certain features that are described in this specification in the context of separate implementations may also be used in combination in a single implementation. Conversely, various features that are described in the context of a single implementation may also be used in multiple implementations separately or in any suitable sub-combination. Although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous, including circumstances where multitasking or parallel processing are not specifically called out herein. Furthermore, the separation of various system components in the implementations described above should not be understood as requiring such separation in all implementations, and it should be understood that the described program components and systems can generally be integrated together in a single software product or packaged into multiple software products.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative implementations that are intended to be exemplary only and not limiting to the full scope of the present invention, as set forth in the appended claims.

The invention claimed is:

1. A method for reducing duplicate data, comprising the steps of:
   a. assembling a set of distribution data, wherein the set of distribution data comprises a plurality of records and each record comprises (i) a plurality of fields and (ii) an anonymous identifier from a set of anonymous identifiers;
   b. for each record in the set of distribution data, identifying a matching anonymous identifier record in a digest comprising a record table comprising a set of anonymous identifier records, wherein each anonymous identifier record in the record table comprises an anonymous identifier from the set of anonymous identifiers and one or more segment indexes from a set of segment indexes;
   c. for each segment in a record of the prospective distribution data, performing a lookup function in a segment table with respect to segment indexes in the matching anonymous identifier record in the record table, wherein the indexes reference entries in the segment table, and wherein the segment table comprises an array of entries with one entry for each field/value pair from a set of existing field value/pairs, each such segment table entry comprising a corresponding field/value pair from the set of existing field/value pairs;
   d. suppressing every field in each record in the set of distribution data if such field comprises a field/value pair that matches a field/value pair identified by the lookup function, and suppressing each record in the set of distribution data if every field of such record is suppressed, to create a set of update distribution data; and
   e. transmitting, from a marketing services provider to a destination, the set of update distribution data.

2. The method of claim 1, further comprising the step of creating the digest prior to the step of assembling a set of distribution data.

3. The method of claim 2, wherein the step of creating the digest comprises the step of creating an anonymous identifier record in the digest for each record in the set of distribution data.

4. The method of claim 2, further comprising the step of creating the segment table prior to the set of assembling a set of distribution data.

5. The method of claim 4, wherein the step of creating the segment table comprises the step of creating a segment table entry for every distinct field/value pair found in the records in the set of distribution data.

6. A programmed computing machine for reducing duplicate data, comprising:
   a. a digest, wherein the digest comprises:
      i. a record table comprising a plurality of anonymous identifier records, wherein each anonymous identifier record comprises an anonymous identifier and at least one segment index from a set of segment indexes;
      ii. a segment table comprising an array of entries with one and only one entry for each field/value pair from a set of existing value/pairs, each such segment table entry comprising a corresponding field/value pair from the set of existing field/value pairs;
   c. a set of distribution data, the set of distribution data comprising a plurality of records each comprising a plurality of fields, and wherein at least one of the plurality of fields comprises a value; and
   d. a distribution routine, wherein the distribution routine is configured to:
      i. for each consumer record in the set of distribution data, identify any matching anonymous identifier record in the digest;
      ii. for each consumer record matched to an anonymous identifier record, attempt to match each field/value pair in the consumer record against the matched anonymous identifier record, in order to determine if the field/value pair has been previously distributed;
      iii. suppress every field in each record in the set of distribution data if such field comprises a field/value pair that matches an field/value identified by the lookup function, and suppressing each record in the set of distribution data if every field of such record is suppressed, to create a set of update distribution data; and
      iv. transmit the set of update distribution data.

7. The machine of claim 6, wherein the digest further comprises a set of metadata, and wherein the set of metadata comprises a creation timestamp.

8. The machine of claim 7, wherein each anonymous identifier record in the digest further comprises an anonymous identifier timestamp.

9. The machine of claim 8, further comprising a timestamp data table comprising a timestamp data table index value and timestamp for each time a field/value pair was added to the segment table, and wherein each anonymous identifier record in the digest further comprises a timestamp data table index value.

10. The machine of claim 6, further comprising a plurality of digests and segment tables, wherein each digest and segment table corresponds to a particular server side account.

11. The machine of claim 6, further comprising a variable array of non-enumerated field/value pairs, and wherein the distribution routine is further configured to perform a lookup function in the variable array of non-enumerated field/value pairs.

12. The machine of claim 6, further comprising an initialization routine configured to create the digest and the segment table.

13. The machine of claim 12, wherein the initialization routine is further configured to append an anonymous identifier record to the digest for each consumer record in the set of distribution data.

14. The machine of claim 13, wherein the initialization routine is further configured to append a segment table entry to the segment table for each distinct field/value pair found in the plurality of fields in the plurality of consumer records in the set of distribution data.

15. The machine of claim 14, wherein the initialization routine is further configured to insert into each anonymous identifier record in the digest at least one segment index corresponding to a segment table entry containing a field/value pair found in the consumer record from the set of distribution data matching such anonymous identifier record.

16. The machine of claim 12, further comprising a backfill reset routine configured to delete all anonymous identifier records from the digest.

17. The machine of claim 12, wherein the initialization routine is further configured to append a new anonymous identifier record to the record table for each distinct anonymous identifier found in the plurality of anonymous identifiers in the set of distribution data, where that anonymous identifier does not already appear in the plurality of anonymous identifier records in the record table.

18. The machine of claim 6, wherein the distribution routine is further configured to, if a record in the set of update distribution data is suppressed, transmit an instruction to delete a corresponding destination record from a set of destination data.

19. The machine of claim 6, wherein the distribution routine is further configured to, if a field in a record of the set of update distribution data is suppressed, to transmit an instruction to delete a corresponding field/value pair from a record of a set of destination data.

* * * * *